United States Patent
Yasuda et al.

(10) Patent No.: US 9,596,083 B2
(45) Date of Patent: Mar. 14, 2017

(54) INFORMATION PROCESSING TECHNIQUE FOR PATTERN MATCHING

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 14/697,573

(22) Filed: Apr. 27, 2015

(65) Prior Publication Data
US 2015/0318991 A1    Nov. 5, 2015

(30) Foreign Application Priority Data
May 2, 2014    (JP) ................................ 2014-095093

(51) Int. Cl.
*H04L 29/06*    (2006.01)
*H04L 9/30*    (2006.01)
*H04L 9/00*    (2006.01)

(52) U.S. Cl.
CPC ............ *H04L 9/3093* (2013.01); *H04L 9/008* (2013.01); *H04L 2209/24* (2013.01)

(58) Field of Classification Search
CPC .... H04B 1/10; G06K 9/0053; G06K 9/00536; G06K 2009/00939; B60R 25/25; A61B 5/7207; A61B 5/18; A61B 5/0059

(Continued)

(56) References Cited

U.S. PATENT DOCUMENTS 5,864,834 A * 1/1999 Arai .................. G06N 3/04
  706/16
6,205,247 B1 * 3/2001 Breuer .............. G06K 9/6281
  382/156

(Continued)

FOREIGN PATENT DOCUMENTS

JP    2007-114494    5/2007
JP    2013-066151    4/2013
JP    2013-130825    7/2013

OTHER PUBLICATIONS

Yasuda, Masaya et al., "Privacy-Preserving Wildcards Pattern Matching Using Symmetric Somewhat Homomorphic Encryption", In: "Lecture Notes in Computer Science", Jul. 9, 2014, Springer Berlin, Heidelberg, vol. 8544, pp. 338-353, XP055212058.

(Continued)

*Primary Examiner* — Mahfuzur Rahman
(74) *Attorney, Agent, or Firm* — Fujitsu Patent Center

(57) ABSTRACT

A matching method includes: generating a first numerical vector; generating a second numerical vector by squaring each component of the first numerical vector and a third numerical vector by cubing each component of the first numerical vector; generating first to third polynomials by executing polynomial transformation of the first to third numerical vectors; encrypting the first to third polynomials by a homomorphic encryption scheme; executing a predetermined operation while keeping data used in the predetermined operation encrypted, by using fourth to sixth polynomials obtained by the polynomial transformation and the homomorphic encryption of fourth to sixth numerical vectors, wherein the fourth numerical vector is generated by numerically vectorizing second text, the fifth numerical vector is generated by squaring each component of the fourth numerical vector, and the sixth numerical vector is generated by cubing each component of the fourth numerical (Continued)

vector; and decrypting a result of the predetermined operation.

5 Claims, 8 Drawing Sheets

(58) Field of Classification Search
USPC .......................................................... 380/28
See application file for complete search history.

(56) References Cited

U.S. PATENT DOCUMENTS

| | | | | |
|---|---|---|---|---|
| 8,165,414 | B1* | 4/2012 | Yagnik | G06F 17/3002 382/236 |
| 8,446,957 | B2* | 5/2013 | Kurata | G06T 7/2026 375/240.16 |
| 2013/0216044 | A1* | 8/2013 | Gentry | H04L 9/008 380/277 |
| 2013/0273968 | A1* | 10/2013 | Rhoads | G06F 17/30244 455/556.1 |
| 2014/0215222 | A1 | 7/2014 | Sakumoto et al. | |
| 2014/0379396 | A1* | 12/2014 | Schroepfer | G06Q 10/0631 705/7.12 |
| 2015/0067874 | A1* | 3/2015 | Johnson | G06F 21/14 726/26 |

OTHER PUBLICATIONS

Vergnaud, Damien, "Efficient and Secure Generalized Pattern Matching via Fast Fourier Transform", Jul. 5, 2011, Progress in Cryptology Africacrypt 2011, Springer Berlin Heidelberg, pp. 41-58, XP047025389.

Lagendijk, R. L. et al., "Encrypted Signal Processing for Privacy Protection," IEEE Signal Processing Magazine, IEEE Service Center, Piscataway, NJ. US, vol. 30, No. 1, Jan. 1, 2013, pp. 82-105, XP011505535.

Baron, Joshua et al.,"5PM: Secure Pattern Matching", International Association for Cryptologic Research, vol. 20121219:161334, Dec. 12, 2012, pp. 1-77, XP061007031.

Yasuda, Masaya et al., "Analysis of Lattice Reduction Attack against the Somewhat Homomorphic Encryption Based on Ideal Lattices", Sep. 13, 2012, Advances in Communication Networking: 20th EUNICE/IFIP EG 6.2, 6.6 International Workshop, Rennes, France, pp. 1-16, XP047037754.

Extended European Search Report dated Sep. 17, 2015 for corresponding from European Patent Application No. 15165670.9, 9 pages. Please note NPL Masaya Yasuda et al., "Secure Pattern Matching using Somewhat Homomorphic Encryption", CCSW-13, pp. 65-76, (Nov. 8, 2013), pp. 65-76 cited herein, was previously cited in an IDS filed on Apr. 27, 2015.

Craig Gentry, "Fully Homomorphic Encryption Using Ideal Lattices", STOC 2009, ACM, pp. 169-178 (2009), 10 pages.

Kristin Lauter et al., "Can Homomorphic Encryption be Practical?", ACM workshop on Cloud Computing Security Workshop-CCSW 2011, ACM (2011), 11 pages.

Masaya Yasuda et al., "Secure Pattern Matching using Somewhat Homomorphic Encryption", CCSW'13, pp. 65-76, (Nov. 8, 2013), 12 pages.

European Office Action dated May 23, 2016 for corresponding European Patent Application No. 15165670.9, 4 pages. Please note reference D2 which is NPL "Vergnaud, Damien et al., "Efficient and Secure Generalized Pattern Matching via Fast Fourier Transform", Jul. 5, 2011 . . . " cited herein, was previously cited in an IDS filed on Oct. 9, 2015.

* cited by examiner

| POSITION | 1 | 2 | 3 | 4 | 5 | 6 | 7 | 8 | 9 | 10 |
|---|---|---|---|---|---|---|---|---|---|---|
| TEXT | a | c | b | a | b | b | a | c | c | b |
| PATTERN | <u>a</u> | b | <u>b</u> | <u>a</u> | c | | | | | |
| | | a | <u>b</u> | b | a | c | | | | |
| | | | a | b | <u>b</u> | a | c | | | |
| | | | | <u>a</u> | <u>b</u> | <u>b</u> | <u>a</u> | <u>c</u> | | |
| | | | | | a | <u>b</u> | b | a | <u>c</u> | |
| | | | | | | a | b | b | a | c |
| SCORE VECTOR | 3 | 1 | 1 | 5 | 2 | 0 | | | | |
RELATED ART
FIG.1
PROVIDER APPARATUS
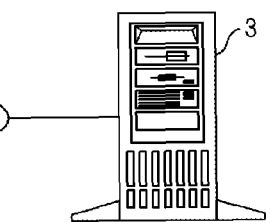
INFORMATION
PROCESSING APPARATUS
COLLATOR APPARATUS
FIG.4

INFORMATION PROCESSING TECHNIQUE FOR PATTERN MATCHING

CROSS-REFERENCE TO RELATED APPLICATIONS

This application is based upon and claims the benefit of priority of the prior Japanese Patent Application No. 2014-095093, filed on May 2, 2014, the entire contents of which are incorporated herein by reference.

FIELD

This invention relates to a technique for performing pattern matching of data while keeping the data encrypted.

BACKGROUND

At present, while regulations on the protection of both private information and confidential information have been strengthened, the market for services using such information is expanding. Encryption techniques capable of using data while keeping private information and confidential information protected have therefore attracted attention. Among encryption techniques, there are ones which use encryption techniques and statistical techniques in accordance with data classification and service requirements.

There is a technique known as a homomorphic encryption scheme, which is a concealment technique using encryption. The homomorphic encryption scheme is a public key encryption scheme such that the encryption key and the decryption key are different, and it is a form of encryption which has a function capable of manipulating data while keeping the data encrypted. For example, assuming that for plain text m1 and m2, the encryption function of a homomorphic encryption scheme for addition or multiplication is given by E, the following expressions (1) or (2) hold.

$$E(m1)+E(m2)=E(m1+m2) \quad (1)$$

$$E(m1)*E(m2)=E(m1*m2) \quad (2)$$

A property such that expression (1) holds is called a homomorphism for addition, and a property such that expression (2) holds is called a homomorphism for multiplication.

Addition and multiplication of encrypted text (also referred to as "cipher text") by using a homomorphic encryption scheme makes it possible to obtain an encrypted operation result of addition and multiplication without decrypting the encrypted text. It is expected that the properties of homomorphic encryption will be used in the fields of electronic voting, electronic money, and similar, and furthermore in recent years it has been expected that they will be used in the cloud computing field.

An RSA (Rivest Shamir Adleman) encryption scheme (homomorphism only for multiplication) and an Additive ElGamal encryption scheme (homomorphism only for addition) are typical of such homomorphic encryption schemes. Moreover, a homomorphic encryption scheme which is capable of both addition and multiplication (an encryption scheme satisfying expressions (1) and (2)) was suggested (a technique suggested in Non-Patent Document 1) in 2009. However, it is known that such a homomorphic encryption scheme is not practical in terms of processing performance and the size of encrypted data. A homomorphic encryption scheme which is capable of both addition and multiplication and is practical in terms of both processing performance and the size of encrypted data was therefore suggested in 2011, and the examples of application was suggested (the technique suggested in Non-Patent Document 2).

Here, the homomorphic encryption scheme proposed in 2011 will be explained (for details, see Section 3.2 of Non-Patent Document 2). Firstly, mainly prepare three key generation parameters (n, q, and t) for encryption key generation. n is an integer, it is the power of 2, and it is referred to as a "lattice dimension"; q is a prime number, and t is an integer which is smaller than the prime number q. In the encryption key generation procedure, firstly an n-dimensional polynomial sk such that each of its coefficients is extremely small is randomly generated as a secret key. The smallness of each coefficient is limited by a parameter σ. Next, an n-dimensional polynomial a1 such that each of its coefficients is smaller than q, and an n-dimensional polynomial e such that each of its coefficients is extremely small, are randomly generated.

$a0=-(a1*sk+t*e)$ is calculated, and a pair $(a0, a1)$ is defined as public key pk. However, when the polynomial a0 is calculated, a polynomial whose degree is always less than n is calculated as $x^n=-1$, $x^{n+1}=-x$, ... for a polynomial whose degree is n or higher. Furthermore, output the remainder obtained by dividing by the prime number q for the coefficients of the polynomials. The space for performing such an operation is academically expressed as $Rq := Fq[x]/(x^n+1)$.

Next, for public key $pk=(a0, a1)$ and plain text data m which is represented by a polynomial of degree n such that each of its coefficients is smaller than t, three n-dimensional polynomials u, f, and g such that each of their coefficients is extremely small are randomly generated, and encryption data $E(m, pk)=(c0, c1)$ for the plain text data m is defined as follows. For $(c0, c1)$, $c0=a0*u+t*g+m$, $c1=a1*u+t*f$ is calculated. Also, operation is performed on the space Rq in these calculations.

Thereafter, for the encrypted text $E(m1, pk)=(c0, c1)$ and $E(m2, pk)=(d0, d1)$, encryption addition $E(m1, pk)+E(m2, pk)$ is calculated as $(c0+d0, c1+d1)$, and encryption multiplication $E(m1, pk)*E(m2, pk)$ is calculated as $(c0*d0, c0*d1+c1*d0, c1*d1)$. Note that such encryption multiplication makes data size of the encrypted text change from a 2-component vector to a 3-component vector.

Lastly, in decryption processing, the secret key sk will be used in calculating $D(c, sk)=[c0+c1*sk+c2*sk^2+ \ldots]$ q mod t for the encrypted text $c=(c0, c1, c2, \ldots)$ (here, it is assumed that the number of data components of the encrypted text data has increased by encryption operations such as multiple encryption multiplication), to complete decryption. Here, w is calculated as the remainder obtained by dividing the integer z by q, and the value of [z]q is outputted as [z]q=w if w<q and the value of [z]q is outputted as [z]q=w−q if w≥q. Furthermore, "a mod t" means the remainder obtained by dividing the integer a by t.

Numerical examples are illustrated for simplicity's sake in the following.

Secret key $sk=Mod(Mod(4, 1033)*x^3+Mod(4, 1033)*x^2+Mod(1, 1033)*x, x^4+1)$

Public Key $pk=(a0, a1)$ $a0=Mod(Mod(885, 1033)*x^3+Mod(519, 1033)*x^2+Mod(621, 1033)*x+Mod(327, 1033), x^4, x^4+1)$ $a1=Mod(Mod(661, 1033)*x^3+Mod(625, 1033)*x^2+Mod(861, 1033)*x+Mod(311, 1033), x^4+1)$ $E(m, pk)=(c0, c1)$ Plain text data $m=3+2x+2x^2+2x^3$ $c0=Mod(Mod(822, 1033)*x^3+Mod(1016, 1033)*x^2+Mod(292, 1033)*x+Mod(243, 1033), x^4+1)$ c1=Mod(Mod(840, 1033)*$x^3$+Mod(275, 1033)*$x^2$+Mod(628, 1033)*x+Mod(911, 1033), $x^4$+1)

In the preceding expressions, (4, 1033, 20) are set to be the key generation parameters (n, q, t). Furthermore, Mod(a, q) means the remainder obtained by dividing integer a by prime number q, and Mod (f (x), $x^4$+1) means a polynomial of the remainder obtained by dividing polynomial f(x) by polynomial $x^4$+1. However, $x^4$=−1, $x^5$=x, . . . and similar hold.

Next, pattern matching will be briefly explained. Pattern matching is, for example, processing which determines whether a pattern string exists in a text string or not. For example, processing which determines whether pattern string P="abbac" exists in text string T="acbabbaccb" or not is considered. At this time, as illustrated in FIG. 1, the number of characters (also referred to as the distance) where the text and the pattern coincide is calculated for text string T, as pattern string P is displaced by one character. In FIG. 1, a list of numerical values representing the number of characters is referred to as a "score vector". In this example, text string T and pattern string P coincide in the component whose score vector value is 5, since the length of pattern string P is 5.

Thus, in pattern matching without encryption, for text string T and pattern string P, the distance between the text string and the pattern string is calculated as pattern string P is displaced by one character at a time.

On the other hand, in secure pattern matching using homomorphic encryption (for example, as in Non-Patent Document 3), a polynomial expressed by using each bit of a binarized text for its coefficients in ascending order of degree is calculated to reduce the data size and distance calculation cost. And the binarized text is encrypted by a homomorphic encryption scheme which is capable of calculating polynomials (for example, homomorphic encryption based on Ring-LWE: see Non-Patent Document 2). On the other hand, a polynomial expressed by using each bit of a binarized pattern for its coefficients in descending order of degree is calculated, and the binarized pattern is encrypted using the same homomorphic encryption scheme.

Thereafter, for the text polynomial and the pattern polynomial which are encrypted by homomorphic encryption, perform encryption operations by using a homomorphism on the polynomials such that each of their coefficients represents a hamming distance between the text and the pattern. Then, identify the hamming distance from each coefficient of polynomials obtained by decrypting the encryption operation result, and determine whether the hamming distance is 0 or not. Secure pattern matching is performed by doing this.

More specifically, from binarized text T=($t_0$, $t_1$, . . . , $t_{k-1}$) whose length is k (also called a binary vector), generate polynomial $m_t(T)=\Sigma_i t_i x_i$ using each bit as its coefficients in ascending order, and for this, generate encrypted text Enc($m_t(T)$, pk) by the aforementioned homomorphic encryption scheme. Text T is encrypted by doing so.

On the other hand, from binarized pattern P=($p_0$, $p_1$, . . . , $p_{l-1}$) whose length is l, generate polynomial $m_p(P)=-\Sigma_j p_j x^{n-j}$ using each bit as its coefficients in descending order, and generate encrypted pattern Enc($m_p(P)$, pk) by using the aforementioned homomorphic encryption scheme. Pattern P is encrypted by doing so.

Next, for the encrypted text Enc($m_t(T)$, pk) and the encrypted pattern Enc($m_p(P)$, pk), calculate the encryption distance as follows.

$$\text{Enc}(m_t(T), pk) * C_1 + \text{Enc}(m_p(P), pk) * C_k - 2\text{Enc}(m_t(T), pk) * \text{Enc}(m_p(P), pk) \quad (3)$$

Here, $C_1$ is a member which includes a polynomial whose length is l in descending order of degree, and $C_k$ is a member which includes a polynomial whose length is k in ascending order of degree. These are represented as follows.

$$C_1 = (-\Sigma_j x^{n-j}, 0) \quad (4)$$

$$C_k = (\Sigma_i x^i, 0) \quad (5)$$

When a result obtained by decrypting an encryption distance calculation result obtained by expression (3) is $r_0 + r_1 x + r_2 x^2 + \ldots + r_{n-1} x^{n-1}$ (a polynomial of degree n, whose coefficients are equal to or less than parameter t), the coefficient $r_i$ of degree i for $0 \le i \le k-1$ coincides with hamming distance d ($T^{(i)}$, P) between partial text $T^{(i)}$ whose first part is the i-th bit and pattern P. Therefore, the degree whose coefficient is 0 may be identified to determine which part of text T includes pattern P from the decryption result $r_0 + r_1 x + r_2 x^2 + \ldots + r_{n-1} x^{n-1}$. In other words, it becomes possible to calculate text T and pattern P while keeping them encrypted by homomorphic encryption.

Here, an approach to such secure pattern matching is explained by using FIG. 2. The following operation is performed so that each coefficient of a polynomial will correspond to hamming distance d($T^{(i)}$, P) in the plain text space.

$$\Sigma_i (HW(T^{(i)}) + HW(P) - 2 < T^{(i)}, P>) x^i \quad (6)$$

HW(A) represents the hamming weight of A, and <A, B> represents the inner product between A and B.

$\Sigma_i HW(T^{(i)}) x^i$ in expression (6) is $m_t(T) * (-\Sigma_i x^{n-j})$, as illustrated in FIG. 2(A). Moreover, $\Sigma_i HW(P) x^i$ in expression (6) is $m_p(P) * (\Sigma_i x^i)$, as illustrated in FIG. 2(B). Furthermore, $\Sigma_i < T^{(i)}, P > x^i$ in expression (6) is $m_t(T) * m_p(P)$, as illustrated in FIG. 2(C).

By doing so, as illustrated in FIGS. 2(A) to 2(C), for each plain text operation, an encryption operation corresponding to the plain text operation is obtained in the encrypted text space. Therefore, as a result, as illustrated in FIG. 2(D), an operation such that the coefficients represent the hamming distance if the polynomials are decrypted is performed by executing the encryption operation as illustrated in expression (3).

However, in performing plain text polynomial operations, output the remainder of division by parameter t, for the coefficients of each polynomial which should be of degree n or less, by calculating a polynomial whose degree is always n or less by calculating $x^n$=−1, $x^{n+1}$=−x, . . . for polynomials whose degree is n or more. Space for performing such an operation is often represented as Rt=Fq[x]/($x^n$+1).

However, since it is not considered to treat a special character (called a wild card) corresponding to any character, it is not possible to efficiently perform secure pattern matching using general patterns such as those including wild cards.

Non-Patent Document 1: C. Gentry, "Fully Homomorphic encryption using ideal lattices", STOC 2009, ACM, pp. 169-178, 2009.

Non-Patent Document 2: K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011.

Non-Patent Document 3: M. Yasuda, T, Shimoyama, J. Kogure, K. Yokoyama and T. Koshiba, "Secure Pattern Matching using Somewhat Homomorphic Encryption", CCSW'13, Nov. 8, 2013, pp. 65-76

In other words, there is no technique to increase the general applicability of secure pattern matching.

SUMMARY

A matching method relating to a first aspect includes: (A) first generating a first numerical vector by numerically vectorizing first text stored in a first data storage unit; (B) second generating a second numerical vector by squaring each component of the first numerical vector and a third numerical vector by cubing each component of the first numerical vector; (C) third generating a first polynomial by executing a polynomial transformation of the first numerical vector, a second polynomial by executing the polynomial transformation of the second numerical vector, and a third polynomial by executing the polynomial transformation of the third numerical vector; (D) encrypting the first polynomial, the second polynomial and the third polynomial by a homomorphic encryption scheme capable of operating polynomials; (E) executing a predetermined operation while keeping data used in the predetermined operation encrypted, by using a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a second data storage unit; and (F) decrypting a result of the predetermined operation.

An encryption method relating to a second aspect includes: (G) first generating a first numerical vector by numerically vectorizing first text stored in a first data storage unit; (H) second generating a second numerical vector by squaring each component of the first numerical vector and a third numerical vector by cubing each component of the first numerical vector; (I) third generating a first polynomial by executing a polynomial transformation of the first numerical vector, a second polynomial by executing the polynomial transformation of the second numerical vector, and a third polynomial by executing the polynomial transformation of the third numerical vector; and (J) encrypting the first polynomial, the second polynomial and the third polynomial by a homomorphic encryption scheme capable of operating polynomials.

An encryption method relating to a third aspect includes: (K) receiving a first polynomial obtained by a polynomial transformation and homomorphic encryption of a first numerical vector, a second polynomial obtained by the polynomial transformation and the homomorphic encryption of a second numerical vector, and a third polynomial obtained by the polynomial transformation and the homomorphic encryption of a third numerical vector, wherein the first numerical vector is generated by numerically vectorizing first text, the second numerical vector is generated by squaring each component of the first numerical vector, the third numerical vector is generated by cubing each component of the first numerical vector; (L) executing a predetermined operation while keeping data used in the predetermined operation encrypted, by using a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a data storage unit; and (M) sending back a result of the predetermined operation.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram explaining pattern matching;

FIG. 4 is a diagram depicting a system outline of this embodiment;

DESCRIPTION OF EMBODIMENTS

Firstly, a processing outline relating to this embodiment will be explained. In this embodiment, as explained by using FIGS. 2(A) to 2(D), operations in the encryption space are stipulated, by defining a distance in the plain text space so that the decryption result will match the distance defined in the relevant plain text space.

Execute numerical vectorization in a way such that text will be $T=(t_0, t_1, t_2,$ and similarly execute numerical vectorization for patterns in away such that $P=(p_0, p_1, p_2, \ldots, p_{l-1})$. Allocate 0 to a wild card, and execute numerical vectorization for other characters according to a predetermined rule (for example, 1 for A, 2 for B, 3 for C, and so on).

Figure 2:
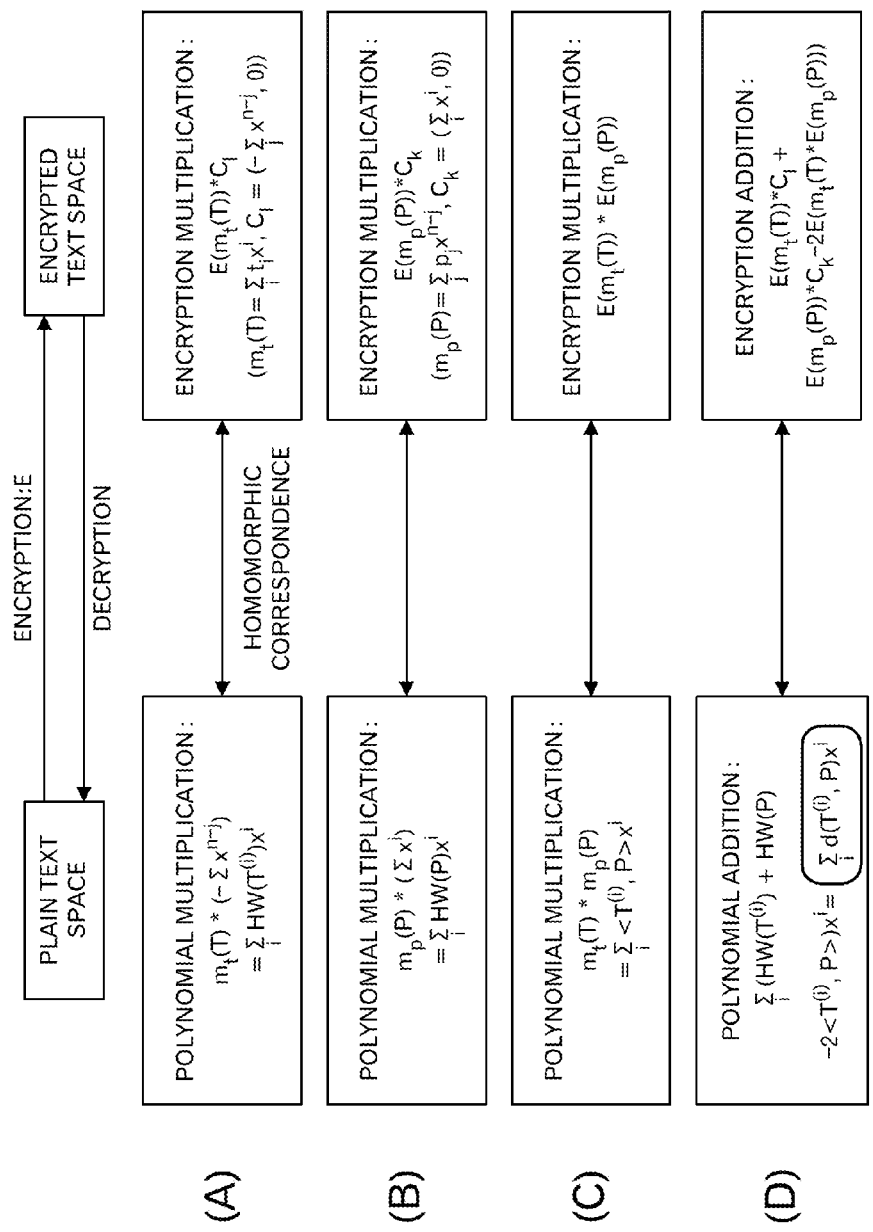
FIG. 2 is a diagram explaining encryption distance calculation.
Figure 3:
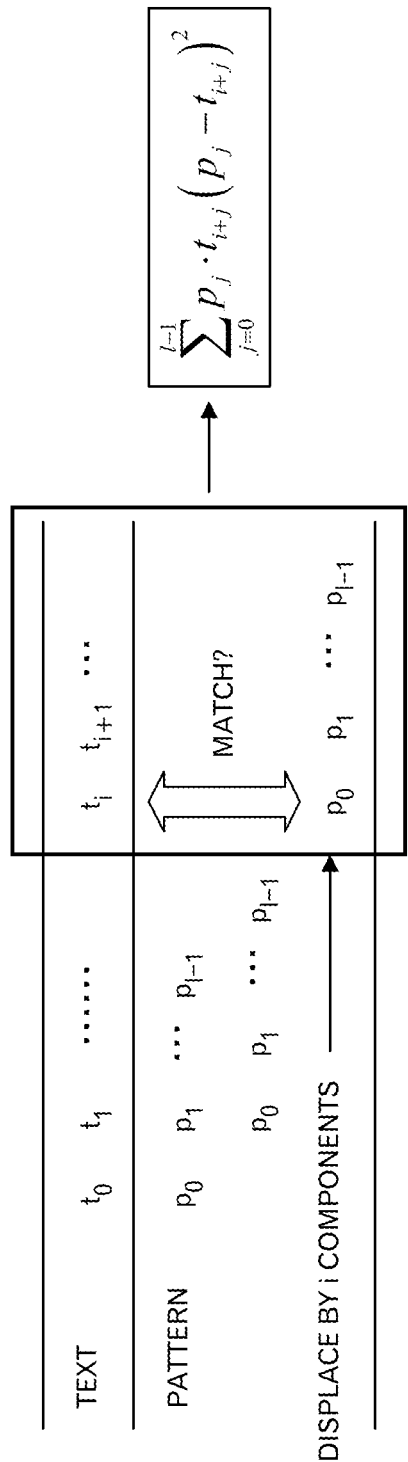
FIG. 3 is a diagram depicting a view relating to this embodiment.

At this time, as illustrated schematically on the left side of FIG. 3, consider making a decision on whether or not patterns match the text, by displacing them along by one component. For example, the distance between the part of the text in which $t_i$ is the first character and the pattern is defined by an expression as illustrated on the right side of FIG. 3.

In this expression, the value of an arbitrary j in the range between j=0 and j=l-1, will be 0 when $p_j=t_{i+j}$; in other words, when a character of the pattern matches with a character of the text. Similarly, the value will also be 0 when $p_j=0$, in other words, when $p_j$ is a wild card. Furthermore, the value will also be 0 when $t_{i+j}=0$, in other words, when $t_{i+j}$ is a wild card.

Finding i with which the distance is 0 by defining such a distance tells us that numerical vector P for the pattern matches with numerical vector T for the text from component Here, generate a polynomial $m_t(T)=\Sigma_i t_i x_i$ using each component as a coefficient in ascending order from numerical vector $T=(t_0, t_1, \ldots, t_{k-1})$, whose length is k for the text.

Similarly, generate the polynomial $m_p(P)=-\Sigma_j p_j x^{n-j}$ using each component as a coefficient in descending order from numerical vector $P=(p_0, p_1, \ldots, p_{l-1})$, whose length is l for the pattern.

Additionally, a polynomial is illustrated below, in which the value of the expression illustrated on the right side of FIG. 3 will be the coefficient of $x^i$, in relation to an arbitrary i which is within the range between i=0 and i=k−1.

$$m_t(T)*m_p(P^3)+m_t(T^3)*m_p(P)-2m_t(T^2)*m_p(P^2) \quad (7)$$

Expression (7) is expressed as follows by using a homomorphic encryption scheme which is capable of calculating polynomials as illustrated in Non-Patent Document 2.

$$E(m_t(T))*E(m_p(P^3))+E(m_t(T^3))*E(m_p(P))-2E(m_t(T^2))*E(m_p(P^2)) \quad (8)$$

Therefore, with $E(m_t(T))$, $E(m_p(P^3))$, $E(m_t(T^3))$, $E(m_p(P))$, $E(m_t(T^2))$, and $E(m_p(P^2))$, it is possible to perform distance operations while keeping the text and pattern encrypted. In this case, the distance is 0 when there is matching in the plain text space.

Next, a system outline of this embodiment is explained by using FIGS. 4 to 9.

As illustrated in FIG. 4, one or more provider apparatuses 5 which register a matching target text and similar, one or more collator apparatuses 7 which request pattern collation processing for the matching target text and similar, and an information processing apparatus 3 included in, for example, a cloud, are connected to a network 1 such as the Internet.

Figure 5:
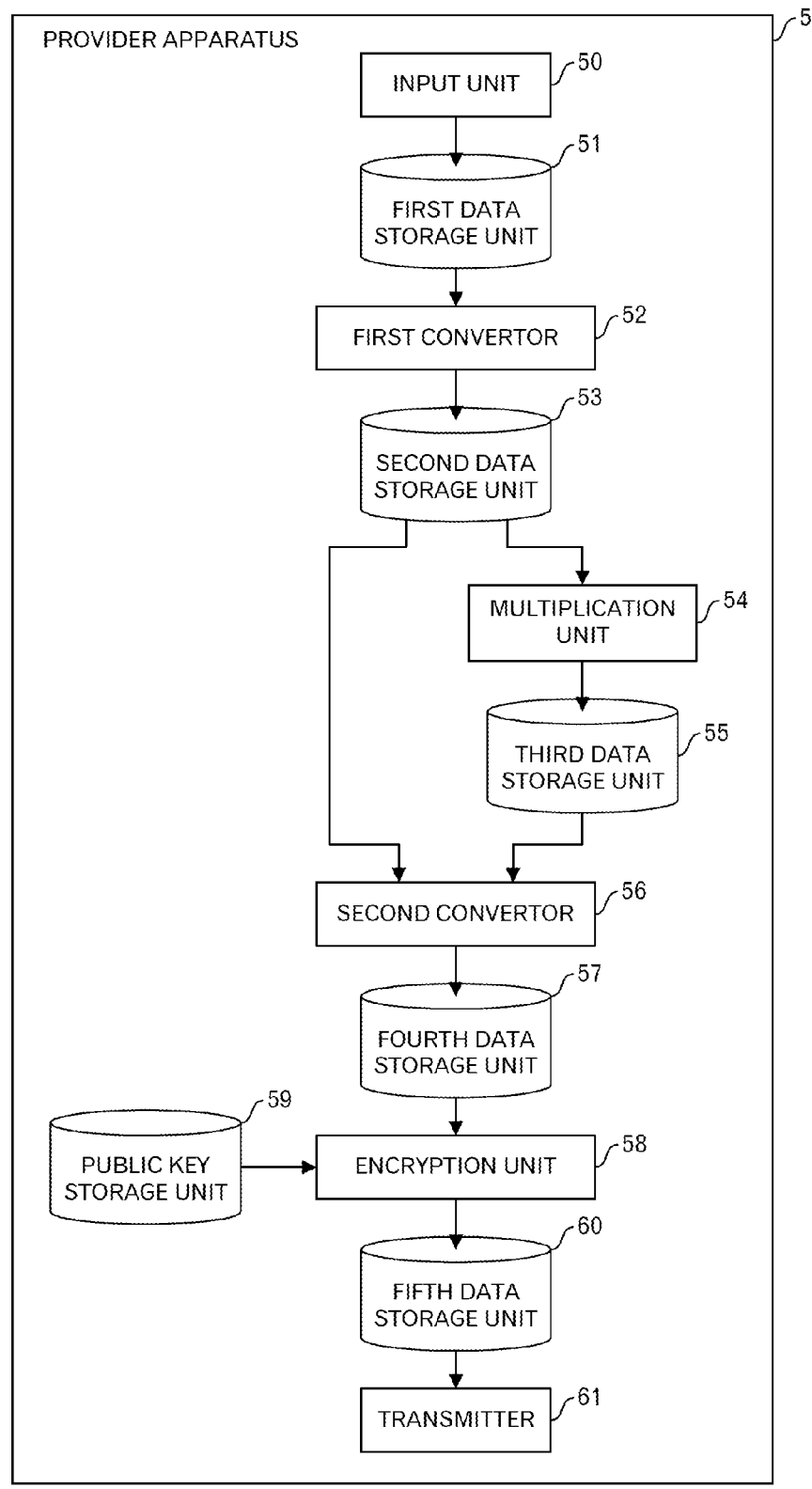
FIG. 5 is a functional block diagram of a provider apparatus.

Next, FIG. 5 illustrates a functional block diagram of the provider apparatus 5. The provider apparatus 5 includes an input unit 50, a first data storage unit 51, a first convertor 52, a second data storage unit 53, a multiplication unit 54, a third data storage unit 55, a second convertor 56, a fourth data storage unit 57, an encryption unit 58, a public key storage unit 59, a fifth data storage unit 60, and a transmitter 61.

The input unit 50 obtains data such as a matching target text to be registered on the information processing apparatus 3 from a user, other computers connected to the network 1, or similar, and stores the data in the first data storage unit 51. Moreover, the first convertor 52 executes numerical vectorization processing for data stored in the first data storage unit 51, and stores the data in the second data storage unit 53.

The multiplication unit 54 generates a numerical vector $T^2$ obtained by squaring each component of a numerical vector T stored in the second data storage unit 53 and a numerical vector $T^3$ obtained by cubing each component of the numerical vector T, and stores them in the third data storage unit 55.

The second convertor 56 converts the numerical vector T stored in the second data storage unit 53 into a polynomial, converts the numerical vectors $T^2$ and $T^3$ stored in the third data storage unit 55 into polynomials, and stores the data of the polynomials in the fourth data storage unit 57.

The encryption unit 58 uses a public key of a collator stored in the public key storage unit 59 according to a homomorphic encryption scheme which is capable of calculating polynomials to encrypt each polynomial stored in the fourth data storage unit 57, and stores the encrypted data in the fifth data storage unit 60. The transmitter 61 transmits data and the length k of the text stored in the fifth data storage unit 60 to the information processing apparatus 3.

Figure 6:
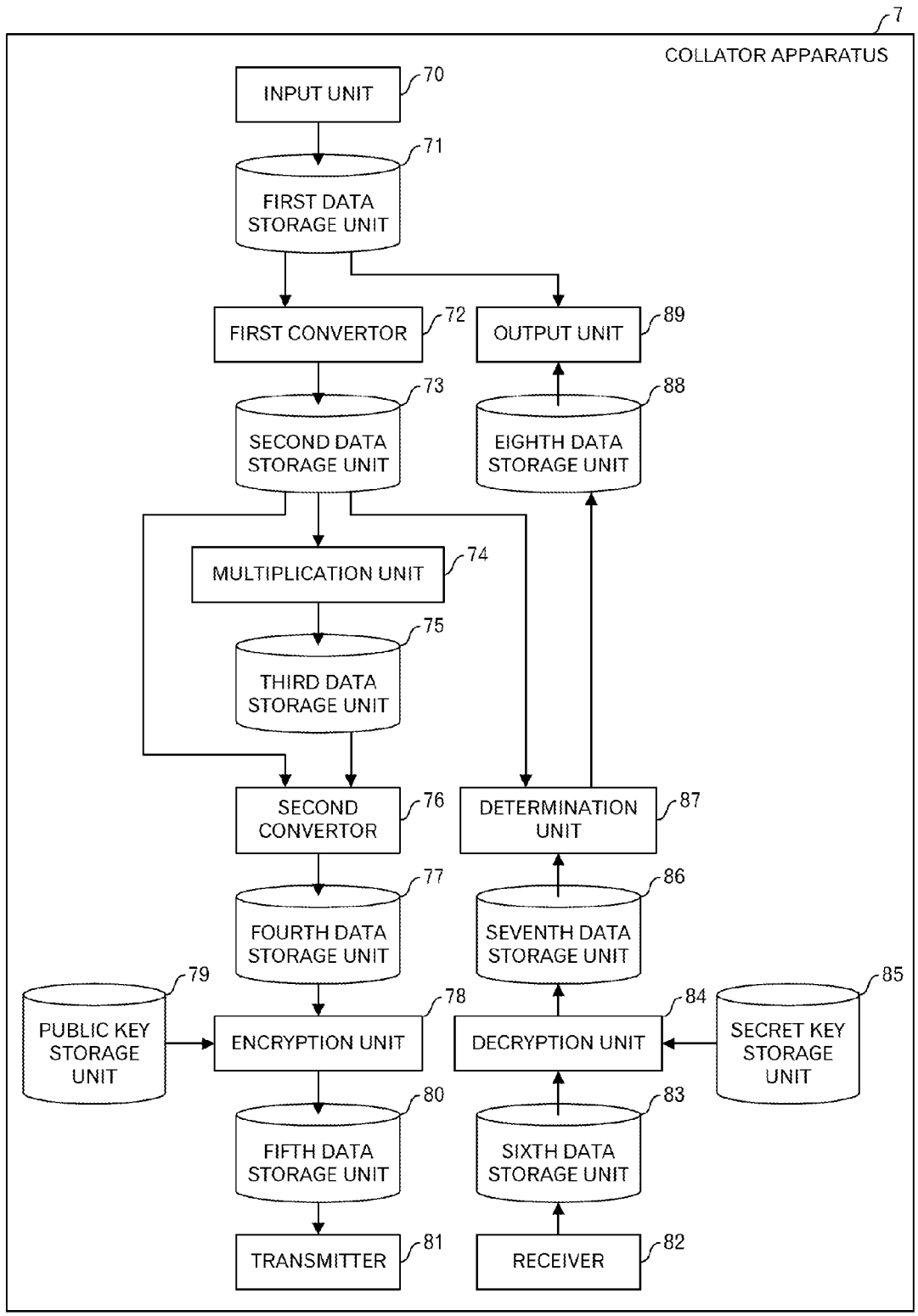
FIG. 6 is a functional block diagram of a collator apparatus.

Next, FIG. 6 illustrates a functional block diagram of the collator apparatus 7. The collator apparatus 7 includes an input unit 70, a first data storage unit 71, a first convertor 72, a second data storage unit 73, a multiplication unit 74, a third data storage unit 75, a second convertor 76, a fourth data storage unit 77, an encryption unit 78, a public key storage unit 79, a fifth data storage unit 80, a transmitter 81, a receiver 82, a sixth data storage unit 83, a decryption unit 84, a secret key storage unit 85, a seventh data storage unit 86, a determination unit 87, an eighth data storage unit 88, and an output unit 89.

The input unit 70 obtains pattern data to be collated with matching target data such as a text from a user or other computers connected to the network 1, and stores the data in the first data storage unit 71. Moreover, the first convertor 72 executes numerical vectorization on data stored in the first data storage unit 71, and stores the vectorized data in the second data storage unit 73.

The multiplication unit 74 generates a numerical vector $P^2$ obtained by squaring each component of a numerical vector P stored in the second data storage unit 73 and a numerical vector $P^3$ obtained by cubing each component of the numerical vector P, and stores them in the third data storage unit 75.

The second convertor 76 converts the numerical vector P stored in the second data storage unit 73 into a polynomial, converts the numerical vectors $P^2$ and $P^3$ stored in the third data storage unit 75 into polynomials, and stores the data of the polynomials in the fourth data storage unit 77.

The encryption unit 78 uses a public key of a collator stored in the public key storage unit 79 according to a homomorphic encryption scheme which is capable of calculating polynomials to encrypt each polynomial stored in the fourth data storage unit 77, and stores the encrypted data in the fifth data storage unit 80. The transmitter 81 transmits data stored in the fifth data storage unit 80 to the information processing apparatus 3.

Moreover, the receiver 82 receives an encryption operation result from the information processing apparatus 3, and stores it in the sixth data storage unit 83. The decryption unit 84 uses a secret key of a collator stored in the secret key storage unit 85 to perform decryption, and stores the processing result in the seventh data storage unit 86. The determination unit 87 determines whether or not there is a part where text coincides with a pattern (the length of the pattern is l) from data stored in the second data storage unit 73 and data stored in the seventh data storage unit 86, and stores the determination result in the eighth data storage unit 88. The output unit 89 outputs the determination result stored in the eighth data storage unit 88 to an output device (for example, another computer, a printing device, or a display device).

Figure 7:
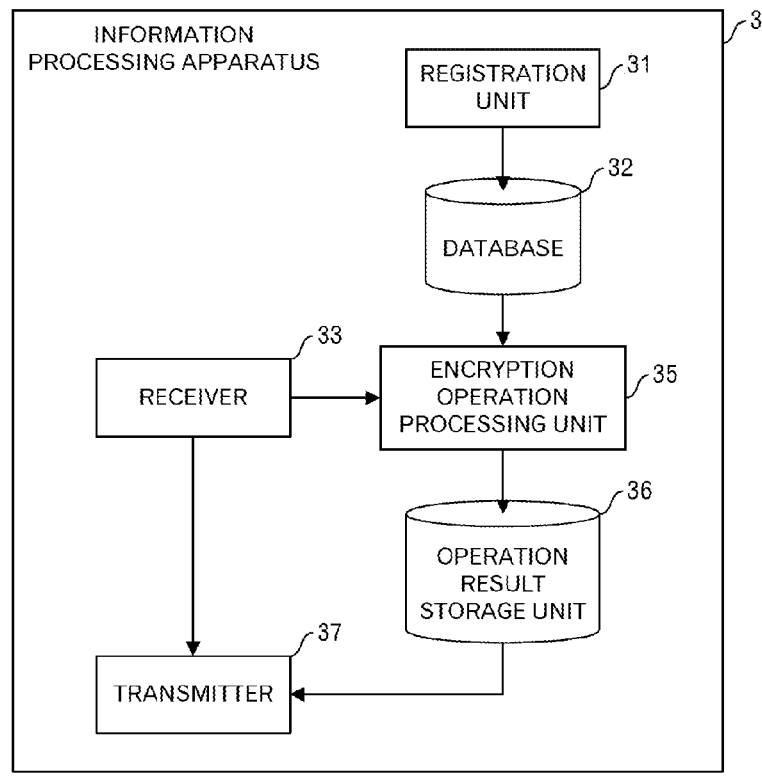
FIG. 7 is a functional block diagram of an information processing apparatus.

Next, FIG. 7 illustrates a functional block diagram of the information processing apparatus 3. The information processing apparatus 3 includes a registration unit 31, a database 32, a receiver 33, an encryption operation processing unit 35, an operation result storage unit 36, and a transmitter 37.

The registration unit 31 receives encrypted data such as a matching target text and the length k of the encrypted data from the provider apparatus 5, and stores them in the database 32. The receiver 33 receives encrypted pattern data to be collated from the collator apparatus 7, and outputs it to the encryption operation processing unit 35.

The encryption operation processing unit 35 uses encrypted pattern data to be collated and encrypted data such as a matching target text stored in the database 32 to execute an encryption operation expressed in the aforementioned expression (8), and stores the operation result in the operation result storage unit 36. Then, the transmitter 37 transmits the operation result and the length k of the text, which is stored in the operation result storage unit 36, to a collation request source obtained from the receiver 33.

Next, processing details of the system illustrated in FIG. 4 will be explained by using FIGS. 8 and 9.

Figure 8:
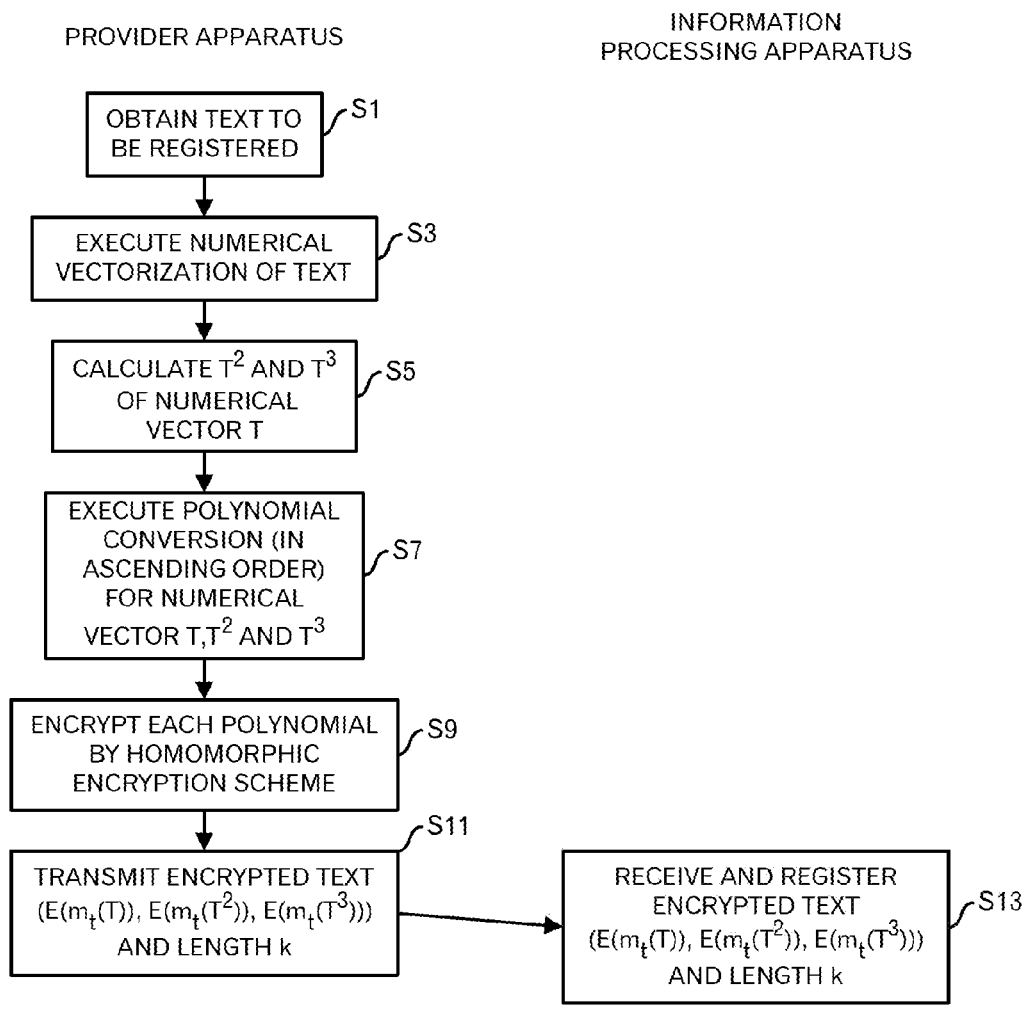
FIG. 8 is a diagram depicting a processing flow of a registration processing.

First, FIG. 8 explains processing when the provider apparatus 5 registers encrypted data of the matching target text in the information processing apparatus 3.

The input unit 50 in the provider apparatus 5 obtains a text to be registered on the information processing apparatus 3 (the text is a mere example, and image data, audio data, and a gene symbol sequence can be considered) from, for example, an information provider or other computers, and stores the text in the first data storage unit 51 (FIG. 8: step S1). Then, the first convertor 52 stores a numerical vector $T=(t_0, t_1, \ldots, t_{k-1})$ in the second data storage unit 53 (step S3), by executing numerical vectorization of the text stored in the first data storage unit 51. A text may include a wild card. In principle, 0 is allocated to a wild card, and a predetermined numerical value is allocated to other characters. For example, a specific numerical value is initially allocated to each kind of gene, followed by numerical vectorization performed by selecting a numerical value in response to a gene included in a gene sequence to be encrypted.

Moreover, the multiplication unit 54 calculates $T^2$ by squaring each component of a numerical vector T stored in the second data storage unit 53, calculates $T^3$ by cubing the numerical vector T, and stores them in the third data storage unit 55 (step S5).

Furthermore, the second convertor 56 executes polynomial conversion for the numerical vector T stored in the second data storage unit 53 and the numerical vectors $T^2$ and $T^3$ stored in the third data storage unit 55, and stores polynomials $m_t(T)$ $m_t(T^2)$, and $m_t(T^3)$ generated by the polynomial conversion in the fourth data storage unit 57 (step S7).

Specifically, generate the polynomial $m_t(T)=\Sigma_i t_i x^i$ by using each component $t_i$ of the numerical vector T as a coefficient of each dimension in ascending order.

Similarly, generate the polynomial $m_t(T^2)=\Sigma_i t^2_i x^i$ by using each component $t^2_i$ of the numerical vector $T^2$ as a coefficient of each dimension in ascending order.

Furthermore, generate a polynomial $m_t(T^3)=\Sigma_i t^3_i x^i$ by using each component $t^3_i$ of the numerical vector T as a coefficient of each dimension in ascending order.

In addition, the second convertor 56 stores the bit length k of the numerical vector T in the fourth data storage unit 57.

Then, the encryption unit 58 generates encrypted text $E(m_t(T))$, $E(m_t(T^2))$, and $E(m_t(T^3))$ and stores them in the fifth data storage unit 60, by encrypting the polynomials $m_t(T)$, $m_t(T^2)$, and $m_t(T^3)$ stored in the fourth data storage unit 57 by using a public key pk of a collator stored in the public key storage unit 59 according to a homomorphic encryption scheme which is capable of calculating polynomials (step S9). In addition, the encryption unit 58 stores the bit length k of the numerical vector T in the fifth data storage unit 60. E(Z) represents the processing of encrypting Z according to a homomorphic encryption scheme which is capable of calculating polynomials.

Thereafter, the transmitter 61 transmits the encrypted text $E(m_t(T))$, $E(m_t(T^2))$, and $E(m_t(T^3))$ stored in the fifth data storage unit 60 and the length k to the information processing apparatus 3 (step S11).

The registration unit 31 in the information processing apparatus 3 receives the encrypted text $E(m_t(T))$, $E(m_t(T^2))$, and $E(m_t(T^3))$ and the length k, and registers them on the database 32 (step S13).

Executing the aforementioned processing makes it possible to register data such as text in the information processing apparatus 3, established on a cloud or similar, while such data is encrypted.

Figure 9:
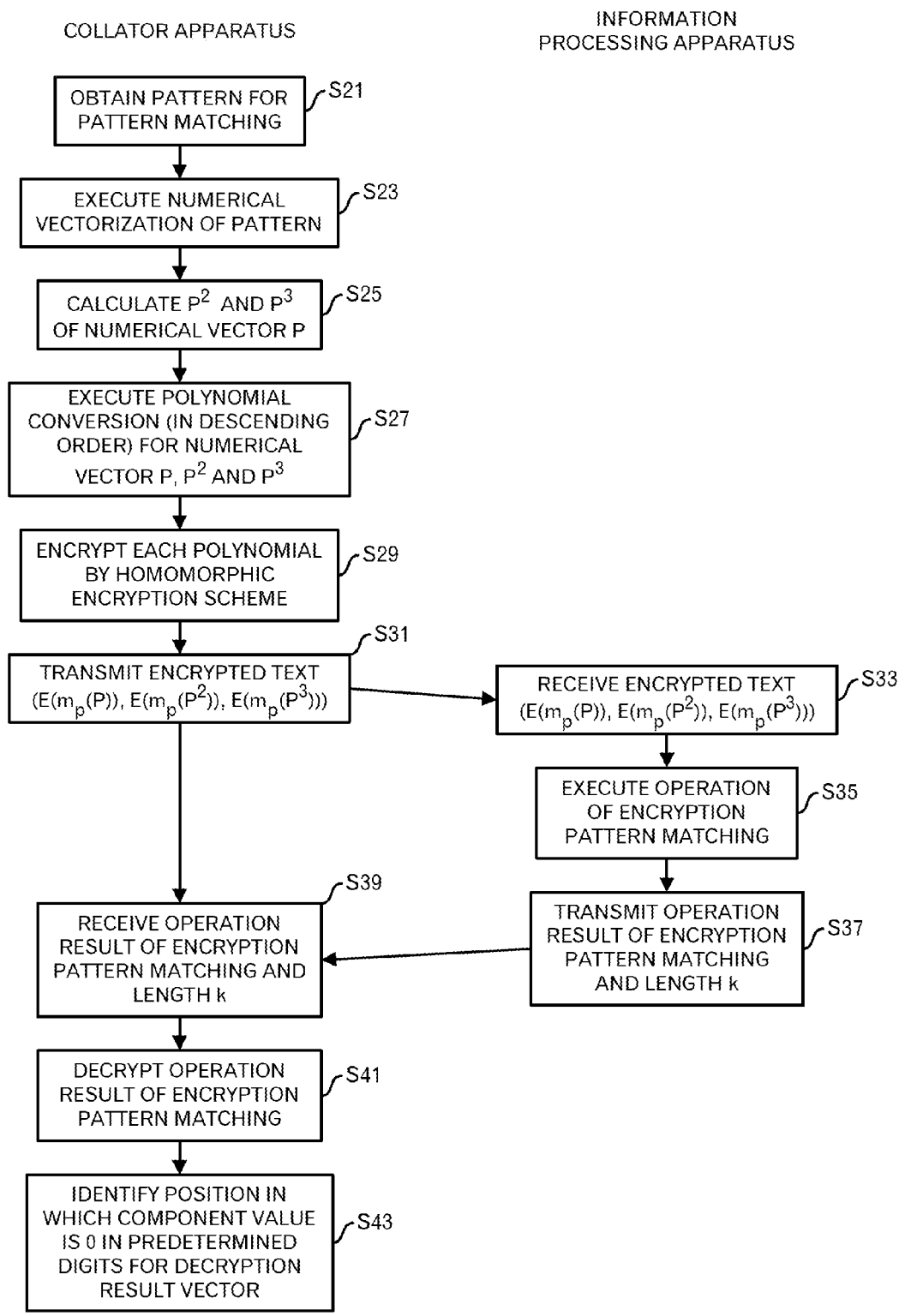
FIG. 9 is a diagram depicting a processing flow of a collation processing.

Next, processing details when a collator causes to perform collation processing in relation to specific patterns is explained by using FIG. 9.

The input unit 70 in the collator apparatus 7 obtains pattern data to be collated with data such as the matching target text from, for example, an information provider, other computers, or similar, and stores the pattern data in the first data storage unit 71 (FIG. 9: step S21).

Then, the first convertor 72 executes numerical vectorization of pattern data stored in the first data storage unit 71, and stores a numerical vector $P=(p_0, p_1, \ldots, p_{l-1})$ in the second data storage unit 73 (step S23).

Moreover, the multiplication unit 74 calculates numerical vector $P^2$ by squaring each component of the numerical vector P stored in the second data storage unit 73, calculates numerical vector $P^3$ by cubing each component of the numerical vector P, and stores them in the third data storage unit 75 (step S25).

Furthermore, the second convertor 76 executes polynomial conversion for the numerical vector P stored in the second data storage unit 73 and the numerical vectors $P^2$ and $P^3$ stored in the third data storage unit 75, and stores polynomials $m_p(P)$ $m_p(P^2)$, and $m_p(P^3)$ generated by the polynomial conversion in the fourth data storage unit 77 (step S27).

Specifically, generate a polynomial $m_p(P)=-\Sigma_j p_j x^{n-j}$ by using each component $p_j$ of the numerical vector P as a coefficient of each dimension in descending order.

Moreover, generate a polynomial $m_p(P^2)=-\Sigma_j p^2_j x^{n-j}$ by using each component $p^2_j$ of the numerical vector $P^2$ as a coefficient of each dimension in descending order.

Furthermore, generate a polynomial $m_p(P^3)=-\Sigma_j p^3_j x^{n-j}$ by using each component $p^3_j$ of the numerical vector $P^3$ as a coefficient of each dimension in descending order.

Then, the encryption unit 78 generates the encryption patterns $E(m_p(P))$ $E(m_p(P^2))$, and $E(m_p(P^3))$ and stores them in the fifth data storage unit 80, by encrypting polynomials $m_p(P)$ $m_p(P^2)$, and $m_p(P^3)$ stored in the fourth data storage unit 77 by using public key pk of a collator stored in the public key storage unit 79 according to a homomorphic encryption scheme which is capable of calculating polynomials (step S29).

Thereafter, the transmitter 81 transmits the encrypted patterns $E(m_p(P))$ $E(m_p(P^2))$, and $E(m_p(P^3))$ stored in the fifth data storage unit 80 to the information processing apparatus 3 (step S31).

The receiver 33 in the information processing apparatus 3 receives the encrypted patterns $E(m_p(P))$, $E(m_p(P^2))$, and $E(m_p(P^3))$ (step S33), and outputs them to the encryption operation processing unit 35.

Then, the encryption operation processing unit 35 executes an operation of encryption pattern matching using the encrypted text $E(m_t(T))$, $E(m_t(T^2))$, and $E(m_t(T^3))$, stored in the database 32, as well as the encrypted patterns $E(m_p(P))$, $E(m_p(P^2))$, and $E(m_p(P^3))$, and stores the operation result d=(d0, d1, ... ) in the operation result storage unit 36 (step S35) according to the expression (8). In addition, the length k of the text is stored in the operation result storage unit 36.

Then, the transmitter 37 transmits the operation result d and the length k of the text stored in the operation result storage unit 36 to the collator apparatus 7, which has transmitted the encrypted patterns or similar to the receiver 33 (step S37).

The receiver 82 in the collator apparatus 7 receives, from the information processing apparatus 3, the operation result d of the encryption pattern matching and the length k of the text, and stores them in the sixth data storage unit 83 (step S39). Then, the decryption unit 84 generates the decryption result vector m=[$m_0$, $m_1$, . . . , $m_{n-1}$], and stores it in the seventh data storage unit 86, by decrypting the operation result d by using secret key sk stored in the secret key storage unit 85 according to a homomorphic encryption scheme which is capable of calculating polynomials (step S41). The length k of the text is also stored in the seventh data storage unit 86.

The determination unit 87 identifies a position in which a component value is 0 in the range between 0 and k−l (the length l is obtained from the second data storage unit 73) for the decryption result vector stored in the seventh data storage unit 86 to determine whether a part corresponding to the pattern exists or not in the matching target text (step S43).

When a vector m=[2, 0, 2, 2, 2, 0, 2, 7] and k−l=8−3=5 hold, it is determined that a part corresponding to the pattern exist in the matching target text since positions "1" and "5" in which a component value is 0 in the range of [2, 0, 2, 2, 2, 0] exist. The determination unit 87 stores the determination result in the eighth data storage unit 88. The output unit 89 outputs the determination result to an output device (a display device, a printing device, or other computers) in response to a request from a collator.

By doing the aforementioned processing, it is possible to obtain an operation result of encryption pattern matching to determine whether a pattern coincides with the matching target text or not while keeping the pattern encrypted. Then, in the collator apparatus 7, when a secret key which only the collator has is used in decryption, it is possible to identify the position in which the pattern appears in the matching target text by simple processing.

Furthermore, it is now possible to deal with the case that a wild card is included in a text and a pattern by the same processing. In other words, this increases the general applicability of secure pattern matching.

The aforementioned embodiment merely illustrates a basic arithmetic operation, and operations can be variously transformed.

Although, within the polynomial in the aforementioned example, a component is used as a coefficient of each degree in ascending order for the text and in descending order for the pattern, and conversely, it is acceptable to adopt a rule in which components are used as coefficients of each degree in descending order for the text and in ascending order for the pattern. Furthermore, although the rule is that a positive coefficient is used for the text, and a negative coefficient is used for the pattern, a negative coefficient may be used for the text, and a positive coefficient may be used for pattern.

Furthermore, although numerical vectorization is performed so that 0 is allocated to a wild card in the aforementioned example, any number may be allocated to a wild card as long as a numerical value allocated to the wild card does not overlap numerical values that correspond to other characters.

In other words, for example, when z is allocated to a wild card, the expression illustrated in the right side of FIG. 3 is modified as follows.

$$\sum_{j=0}^{l-1} (p_j - z)(t_{i+j} - z)(p_j - t_{i+j})^2$$

An operation of encryption pattern matching is stipulated if a corresponding polynomial operation is stipulated by developing such an expression. The operation is still performed based on T, $T^2$, $T^3$, P, $P^2$, and $P^3$ even in this case.

Although the embodiment of this invention was explained above, this invention is not limited to this embodiment. For example, the functional block diagram of each apparatus may not correspond to program module configurations. Moreover, as for the processing flows, as long as the processing results do not change, the turns of the steps may be exchanged or plural steps may be executed in parallel.

Moreover, each apparatus may be implemented by one computer or multiple computers. Furthermore, the collator apparatus 7 and the provider apparatus 5 may be integrated.

Figure 10:
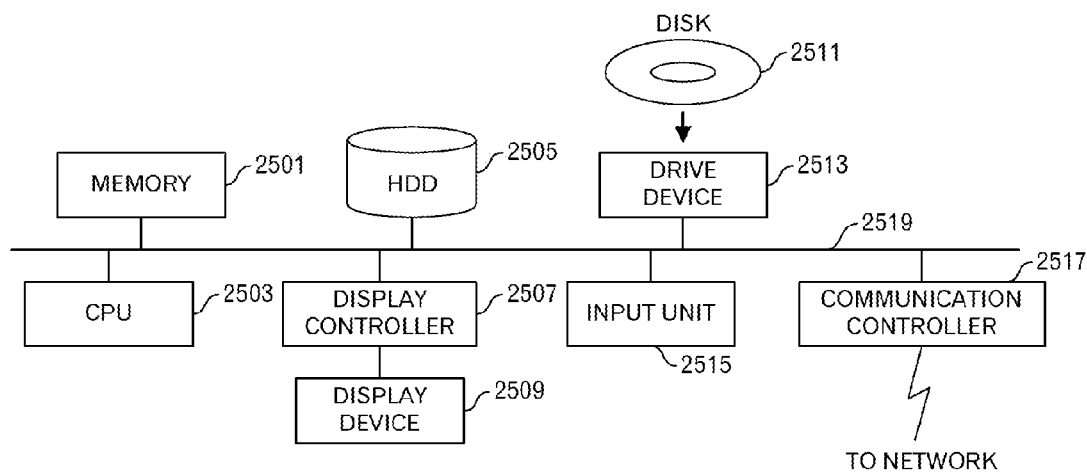
FIG. 10 is a functional block diagram of a computer.

In addition, the aforementioned information processing apparatus 3, provider apparatus 5 and collator apparatus 7 are computer devices as illustrated in FIG. 10. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 10. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiment is summarized as follows:

A matching method relating to a first aspect of this embodiment includes: (A) first generating a first numerical vector by numerically vectorizing first text stored in a first data storage unit; (B) second generating a second numerical vector by squaring each component of the first numerical vector and a third numerical vector by cubing each component of the first numerical vector; (C) third generating a first polynomial by executing a polynomial transformation of the first numerical vector, a second polynomial by executing the polynomial transformation of the second numerical vector, and a third polynomial by executing the polynomial transformation of the third numerical vector; (D) encrypting the first polynomial, the second polynomial and the third polynomial by a homomorphic encryption scheme capable of operating polynomials; (E) executing a predetermined operation while keeping data used in the predetermined operation encrypted, by using a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a second data storage unit; and (F) decrypting a result of the predetermined operation.

By doing such processing, it is possible to determine whether the first text coincides with a part of the second text while keeping them encrypted. The reason why a square of the numerical vector and a cube of the numerical vector are prepared at this time is because of dealing with the case that a wild card is included, and this increases the general applicability of secure pattern matching.

Namely, the predetermined operation may include an operation in which a distance becomes 0 on (e1) a condition that the first text coincides with a part of the second text, (e2) a condition that the first text that includes a special character representing any character coincides with the part of the second text, and (e3) a condition that the first text coincides with the part of the second text that includes the special character on the plain text.

Moreover, the matching method may further include (G) identifying a component whose value is 0 in a vector included in the result of the predetermined operation. Doing this enables a decision to be made on the position in which the first text matches within the second text.

Furthermore, the polynomial transformation to obtain the fourth to sixth polynomials may differ from the polynomial transformation to obtain the first to third polynomials.

An encryption method relating to a second aspect of this embodiment includes: (H) first generating a first numerical vector by numerically vectorizing first text stored in a first data storage unit; (I) second generating a second numerical vector by squaring each component of the first numerical vector and a third numerical vector by cubing each component of the first numerical vector; (J) third generating a first polynomial by executing a polynomial transformation of the first numerical vector, a second polynomial by executing the polynomial transformation of the second numerical vector, and a third polynomial by executing the polynomial transformation of the third numerical vector; and (K) encrypting the first polynomial, the second polynomial and the third polynomial by a homomorphic encryption scheme capable of operating polynomials.

Aforementioned processing is executed when registering text and searching by a pattern.

An encryption method relating to a third aspect of this embodiment includes: (L) receiving a first polynomial obtained by a polynomial transformation and homomorphic encryption of a first numerical vector, a second polynomial obtained by the polynomial transformation and the homomorphic encryption of a second numerical vector, and a third polynomial obtained by the polynomial transformation and the homomorphic encryption of a third numerical vector, wherein the first numerical vector is generated by numerically vectorizing first text, the second numerical vector is generated by squaring each component of the first numerical vector, the third numerical vector is generated by cubing each component of the first numerical vector; (M) executing a predetermined operation while keeping data used in the predetermined operation encrypted, by using a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a data storage unit; and (N) sending back a result of the predetermined operation.

For example, a computer in a cloud executes.

An information processing apparatus has: circuitry configured or programmed to generate a first numerical vector by numerically vectorizing first text stored in a first data storage unit; circuitry configured or programmed to generate a second numerical vector by squaring each component of the first numerical vector and a third numerical vector by cubing each component of the first numerical vector; circuitry configured or programmed to generate a first polynomial by executing a polynomial transformation of the first numerical vector, a second polynomial by executing the polynomial transformation of the second numerical vector, and a third polynomial by executing the polynomial transformation of the third numerical vector; and circuitry configured or programmed to encrypt the first polynomial, the second polynomial and the third polynomial by a homomorphic encryption scheme capable of operating polynomials.

An information processing apparatus has: circuitry configured or programmed to receive a first polynomial obtained by a polynomial transformation and homomorphic encryption of a first numerical vector, a second polynomial obtained by the polynomial transformation and the homomorphic encryption of a second numerical vector, and a third polynomial obtained by the polynomial transformation and the homomorphic encryption of a third numerical vector, wherein the first numerical vector is generated by numerically vectorizing first text, the second numerical vector is generated by squaring each component of the first numerical vector, the third numerical vector is generated by cubing each component of the first numerical vector; circuitry configured or programmed to execute a predetermined operation while keeping data used in the predetermined operation encrypted, by using a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a data storage unit; and circuitry configured or programmed to send back a result of the predetermined operation.

Incidentally, it is possible to create a program causing a computer or processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A matching method, comprising:
   first generating, by a system that includes a plurality of computers, a first numerical vector by numerically vectorizing first text stored in a first data storage unit;
   second generating, by the system, a second numerical vector by squaring each component of the first numerical vector and a third numerical vector by cubing each component of the first numerical vector;
   third generating, by the system, a first polynomial by executing a polynomial transformation of the first numerical vector, a second polynomial by executing the polynomial transformation of the second numerical vector, and a third polynomial by executing the polynomial transformation of the third numerical vector;
   encrypting, by the system, the first polynomial, the second polynomial and the third polynomial by a homomorphic encryption scheme capable of operating polynomials;
   executing, by the system, an operation in which a distance between the first text and second text in pattern matching becomes 0 when the first text coincides with a part of the second text, when the first text that includes a special character representing any character coincides with the part of the second text, and when the first text coincides with the part of the second text that includes the special character, while keeping data used in the operation encrypted, by using the encrypted first polynomial, the encrypted second polynomial, the encrypted third polynomial, a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing the second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a second data storage unit;
   decrypting, by the system, a result of the operation; and
   determining, by the system and based on the decrypted result, whether the first text exists in the second text.

2. The matching method as set forth in claim 1, wherein the determining comprises identifying a component whose value is 0 in a vector included in the decrypted result.

3. The matching method as set forth in claim 1, wherein the polynomial transformation to obtain the fourth to sixth polynomials differs from the polynomial transformation to obtain the first to third polynomials.

4. An information processing system, comprising:
   a first information processing apparatus accessible to a first data storage unit that stores first text; and
   a second information processing apparatus, and
   wherein the first information processing apparatus comprises:
   a first memory; and
   a first processor coupled to the first memory and configured to:
   generate a first numerical vector by numerically vectorizing the first text stored in the first data storage unit;
   generate a second numerical vector by squaring each component of the first numerical vector and a third numerical vector by cubing each component of the first numerical vector;
   generate a first polynomial by executing a polynomial transformation of the first numerical vector, a second polynomial by executing the polynomial transformation of the second numerical vector, and a third polynomial by executing the polynomial transformation of the third numerical vector;
   encrypt the first polynomial, the second polynomial and the third polynomial by a homomorphic encryption scheme capable of operating polynomials; and
   transmit the encrypted first polynomial, the encrypted second polynomial, and the encrypted third polynomial to the second information processing apparatus,
   the second information processing apparatus comprises:
   a second memory; and
   a second processor coupled to the second memory and configured to:
   receive the encrypted first polynomial, the encrypted second polynomial, and the encrypted third polynomial from the first information processing apparatus;
   execute an operation in which a distance between the first text and second text in pattern matching becomes 0 when the first text coincides with a part of the second text, when the first text that includes a special character representing any character coincides with the part of the second text, and when the first text coincides with the part of the second text that includes the special character, while keeping data used in the operation encrypted, by using the encrypted first polynomial, the encrypted second polynomial, the encrypted third polynomial, a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing the second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a second data storage unit;
transmit a result of the operation, and
the first processor is configured to:
receive the result of the operation;
decrypt the result of the operation; and
determine, based on the decrypted result, whether the first text exists in the second text.

5. A computer-readable, non-transitory storage medium storing a program that causes a computer to execute a process, the process comprising:

receiving a first polynomial obtained by a polynomial transformation and homomorphic encryption of a first numerical vector, a second polynomial obtained by the polynomial transformation and the homomorphic encryption of a second numerical vector, and a third polynomial obtained by the polynomial transformation and the homomorphic encryption of a third numerical vector, wherein the first numerical vector is generated by numerically vectorizing first text, the second numerical vector is generated by squaring each component of the first numerical vector, the third numerical vector is generated by cubing each component of the first numerical vector;

executing an operation in which a distance between the first text and second text in pattern matching becomes 0 when the first text coincides with a part of the second text, when the first text that includes a special character representing any character coincides with the part of the second text, and when the first text coincides with the part of the second text that includes the special character, while keeping data used in the operation encrypted, by using the first polynomial, the second polynomial, the third polynomial, a fourth polynomial obtained by the polynomial transformation and the homomorphic encryption of a fourth numerical vector, a fifth polynomial obtained by the polynomial transformation and the homomorphic encryption of a fifth numerical vector, and a sixth polynomial obtained by the polynomial transformation and the homomorphic encryption of a sixth numerical vector, wherein the fourth numerical vector is generated by numerically vectorizing the second text, the fifth numerical vector is generated by squaring each component of the fourth numerical vector, the sixth numerical vector is generated by cubing each component of the fourth numerical vector, and the fourth polynomial, the fifth polynomial and the sixth polynomial are stored in a data storage unit; and sending back a result of the operation, which is used to determine whether the first text exists in the second text.

* * * * *